M. WALKER.
ELECTRICAL CONVERTER.
APPLICATION FILED DEC. 23, 1916.
1,300,308.
Patented Apr. 15, 1919.
2 SHEETS—SHEET 1.
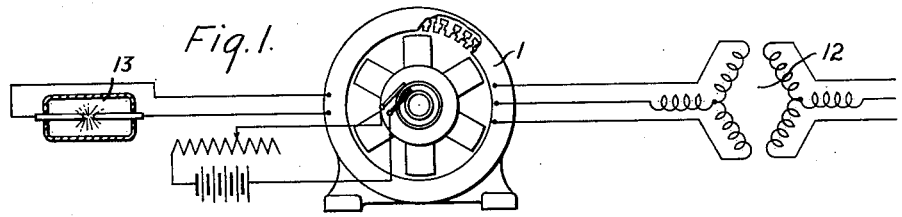
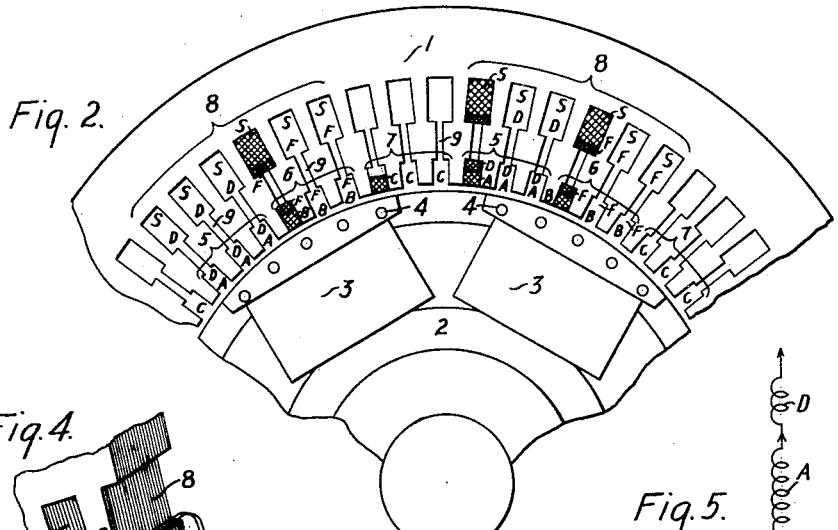
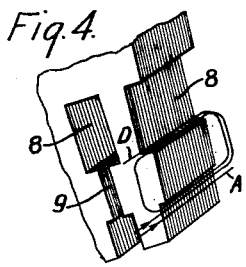
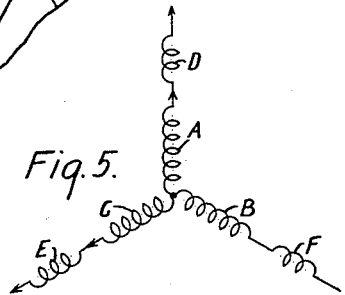
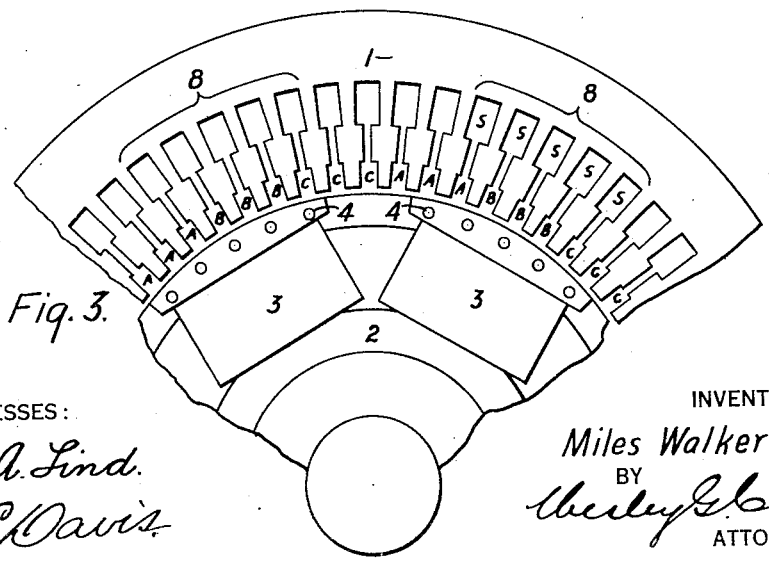
WITNESSES:
Fred A. Lind.
L. C. Davis.
INVENTOR
Miles Walker
BY
Charley G. Carr
ATTORNEY

M. WALKER.
ELECTRICAL CONVERTER.
APPLICATION FILED DEC. 23, 1916.

1,300,308.

Patented Apr. 15, 1919.
2 SHEETS—SHEET 2.

WITNESSES:
Fred. A. Lind.
O. C. Davis.

INVENTOR
Miles Walker
BY
Wesley G. Carr
ATTORNEY

UNITED STATES PATENT OFFICE.

MILES WALKER, OF MANCHESTER, ENGLAND.

ELECTRICAL CONVERTER.

1,300,308.  Specification of Letters Patent.  Patented Apr. 15, 1919.

Application filed December 23, 1916. Serial No. 138,528.

*To all whom it may concern:*

Be it known that I, MILES WALKER, a subject of the King of Great Britain, and a resident of Manchester, in the county of Lancaster, England, have invented a new and useful Improvement in Electrical Converters, of which the following is a specification.

This invention relates to electrical converters and balancers for converting electrical energy from a polyphase supply to a single-phase supply and vice versa, or from one polyphase supply to another polyphase supply having different characteristics, as in operating a single-phase railway load or a single-phase electric furnace from a polyphase system.

It is already known that when a single-phase load is to be supplied with energy from a polyphase source, a balancer consisting of a polyphase synchronous or asynchronous motor may be run in parallel with the load for the purpose of balancing the phases. In order that this balance may be brought about with full load on the system, it is necessary to boost the voltage in some of the phases so as to compensate for the drop in voltage caused by the single-phase load. If the amount of boost is constant, the phases become unbalanced with changing load on the system, and the lack of balance may be excessive on no load, or when the load becomes short circuited. Furthermore, it has been the practice to limit the current which can flow through a system of the character designated, as, for example, an electric furnace, on short circuit by connecting a choke coil in series therewith. The use of such a choke coil, however, results in the furnace load having a very low power factor.

According to the present invention, I combine the choke coil and phase-balancer in such manner that, while the full effect of the choking action is preserved, the power-factor on the polyphase system is very much improved.

Figure 6:
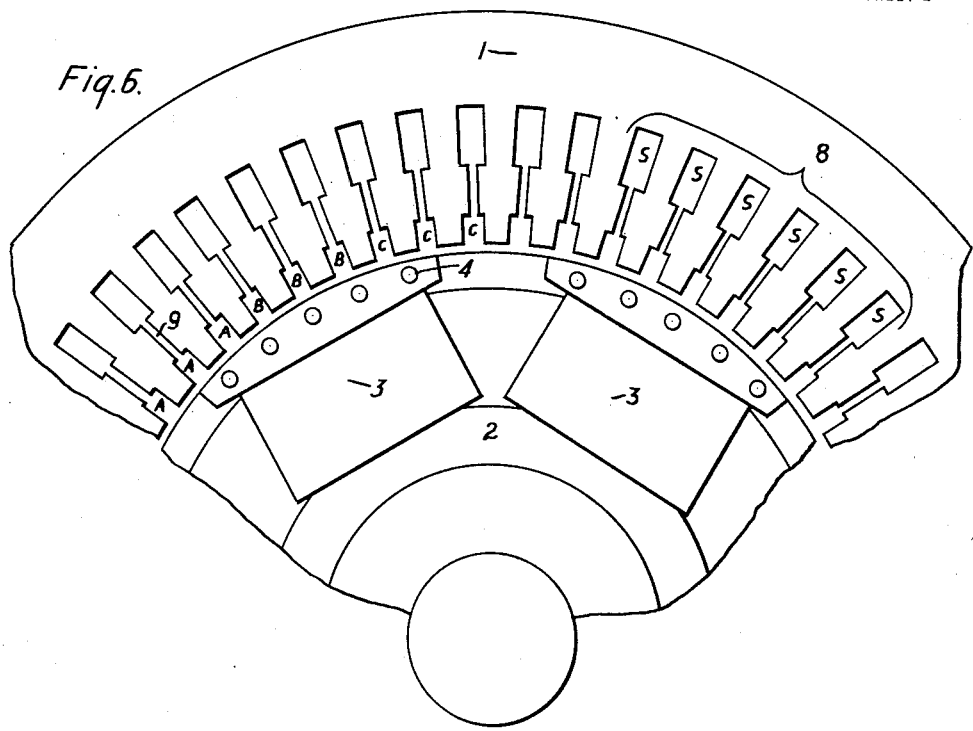
Figure 7:
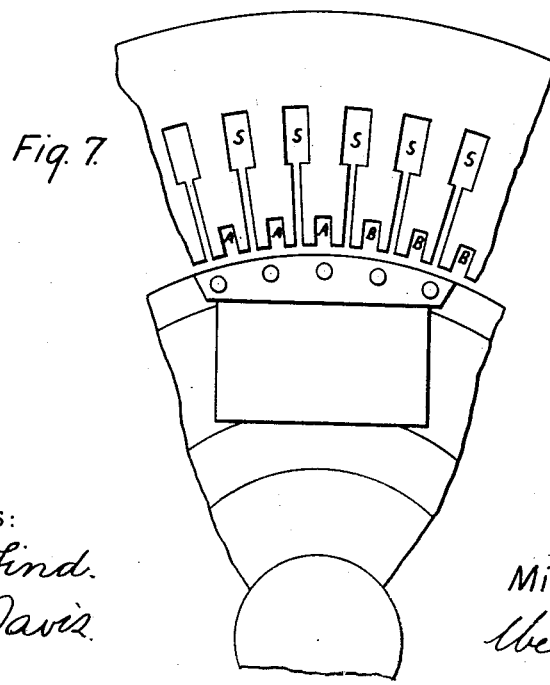

In the accompanying drawing, Figure 1 is a diagrammatic view of a phase balancer embodying my invention, together with associated auxiliary apparatus; Fig. 2 is a partial diagrammatic view of a balancer constructed according to my invention, having a revolving field and a stationary armature; Figs. 3, 6, and 7 are views similar to Fig. 2 and illustrating modifications of the machine shown in that figure; Fig. 4 is a detail perspective view illustrating one of the coils of the winding in which the compensating voltage is generated; and Fig. 5 is a diagram illustrating the manner of connecting the compensating windings to the three-phase winding.

The machine shown in Fig. 2 consists of a stator 1 composed of magnetizable laminæ and having the various windings described below, and a rotor 2 which, in this case, is made exactly as the revolving field-magnet of a synchronous motor having exciting coils 3 and amortisseurs 4.

The windings on the stator are placed in two layers. Near to the working face is an ordinary three-phase winding, consisting of three-phases A, B and C, placed in slots 8, as in an ordinary three-phase synchronous motor; the three-phase groups of this winding are shown at 5, 6 and 7, respectively. In another layer, somewhat back from the working face, is a single-phase winding shown at S, lying in the slots 8—8. Upon connecting the three-phase winding to a polyphase source, shown at 12 in Fig. 1, the balancer machine 1 runs as an ordinary three-phase synchronous motor, the power-factor being controlled by the current in the field-windings 3, as is well understood in the art. The revolving magnetic field cuts across the single-phase conductors S and generates, in them, an electromotive force. If the terminals of this winding are connected to an electric furnace or other single-phase load, as shown at 13 in Fig. 1, current will flow through the winding S. The slots 8—8 in which the winding S is wound and the iron in the vicinity of the winding are made of such shape that, when current flows in the winding considerable magnetic leakage occurs across the mouths of the slots. In Fig. 2 the mouths 9 of the slots are shown of such shape as to produce this effect. If it is desired to have an inductive drop in the single-phase winding at full load equal to 70 per cent. of the no-load voltage, the mouths 9 of the slots are arranged of such depth and such width that the magnetomotive force yielded by full-load current flowing in the winding S creates a leakage flux thereacross equal to 70 per cent. of the working flux at no load. Only a very small part of this leakage flux affects the drop in the three-phase winding because that winding is placed near the working face.

The provision of this leakage path around the single-phase winding gives the same characteristics to the single-phase circuit as would the addition of a choke coil to an ordinary single-phase circuit; but I obtain this advantage, that the generating flux and the leakage flux are combined in one iron core so that, in reality, the only flux which cuts across the single-phase winding at full load is that which generates the resultant electromotive force.

As, in general, the current in the single-phase winding will lag considerably behind the phase of the no-load electromotive force, the single-phase winding will exercise a demagnetizing effect on the revolving field-magnet 2. This demagnetizing effect may be compensated for by over-exciting the magnet 3 at no-load. In addition to this demagnetizing effect, there will be a single-phase reaction upon the field-magnet which is, in a great measure, compensated for by currents generated in the amortisseur winding. The amortisseur winding will, in fact, prevent any considerable change in the strength of the field-magnet from instant to instant, so that the interference between the single-phase winding and the three-phase winding, which would otherwise occur, is minimized.

There will, nevertheless, be a certain amount of interference with the back electromotive force in the three-phase winding when load is placed upon the single-phase winding. For instance, with the winding arrangement of Fig. 2, when the winding S is carrying a single-phase load, it will tend to throw a single-phase load upon the phases A and B of the three-phase supply. This is mainly brought about by the action of the magnetomotive force created by the winding in the single-phase slots which produces a leakage flux across the slots of phases A and B and interferes with the symmetry of the back electromotive forces in the three phases A, B and C.

In order to overcome this interference between the single-phase winding and the three-phase winding, I employ a compensating winding D, E and F, shown diagrammatically in Figs. 4 and 5. This is in the nature of a ring winding wound partly in the three-phase slot space and partly in the single-phase slot space. It is connected in series with the three-phase winding, as indicated in Fig. 5. The end of the winding of phase A, instead of being carried immediately to a terminal, is connected to the end of the compensating winding D which lies in the same slots as winding A and in the single-phase slots immediately behind winding A.

In the following explanation, conductors generating an electromotive force, which is in the same direction as in the other conductors in phase A, will be spoken of as "go" conductors, and conductors having an electromotive force in the opposite direction will be spoken of as "return" conductors. The "go" conductors of the compensating winding D lie in the same slots as the conductors of phase A, and the "return" conductors lie in the single-phase slots immediately behind phase A.

The action of this compensating winding is as follows: Whenever a magnetomotive force is exerted by the current in the single-phase conductors lying in the slots immediately behind phase A, it produces a flux, part of which crosses the slots of phase A, thereby interfering with the back electromotive force generated in the conductors in phase A, and, at the same time, it produces a greater flux across the leakage path 9. Now, as this leakage flux is embraced by the ring winding D, an electromotive force is set up in the winding D which is directly in phase with the interfering electromotive force set up in the winding A. But the winding D is connected so as to make the electromotive force in it oppose the interfering electromotive force in winding A. The number of turns of the winding D is so chosen as to make this compensating electromotive force nearly balance the interfering electromotive force in phase A. It is only necessary to calculate the total effect of the leakage flux produced by the single-phase winding upon the winding A, and then choose such number of windings in D as to generate an equal electromotive force in the winding D, having regard to the reluctance of the leakage path 9 and the total flux threaded through the compensating winding D.

It thus comes about that the three-phase winding is very slightly affected by the single-phase load, and an approximate balance of phases can be obtained from no load to full load. It will, in general, be found that there is still a slight want of balance of the phases owing to the interference of the single-phase current with the field strength. This small interference with the balance of the phases can, if necessary, be compensated for by small boosting electromotive forces introduced into the phases A, B and C, either by means of small boosting transformers or by tapping off the windings in an unsymmetrical manner, according to methods understood in the art.

I do not confine myself to the arrangement of single-phase winding and three-phase winding shown in Fig. 2. The single-phase winding may be placed either immediately behind phases A and B, as shown in Fig. 2, or partly behind phases A, B and C, as shown in Fig. 3; in fact, the phase position of the single-phase winding can have any position relatively to the phases A, B and C.

In order to reduce the iron loss in the machine, I may leave unpunched all the slots not containing windings in Figs. 2, 3, 6 and 7. For instance, in Fig. 2 I may have only six single-phase slots instead of nine. I may also leave out the winding F.

It is not necessary that the single-phase winding and the three-phase winding shall be placed opposite all the poles of the balancer; some poles may have only singlephase winding and some poles only threephase winding, as shown in Fig. 6; or a combination may be made of Figs. 2 and 6, so that, while some poles have both singlephase and three-phase windings, other poles have only single-phase and others again only three-phase windings. Various arrangements of this kind are of convenience in adjusting the number of turns per pole in order to secure the required ratio of transformation, and, at the same time, the synchronizing power of the motor can be adjusted by providing a greater number of poles with three-phase windings than with single-phase windings.

It will also be understood that, while I have, for convenience, spoken of the winding lying back from the working surface of the machine as the single-phase winding, two or more such windings may be provided for connection to two or more loads; such windings will, in general, differ in phase from one another so as to constitute a second polyphase winding on the balancer. When this is done, the single-phase interference with the field-magnet is reduced or entirely eliminated when the loads on these windings are equal.

Where, as in Fig. 1, I provide an exciting winding on the rotor, the balancer runs as a synchronous motor and can be made to run on unity power factor or leading power factor at full load. I may, however, omit the exciting winding 3 in Fig. 1 and use only the amortisseur winding 4, in which case, the balancer runs as an asynchronous motor, balancing the phases in the same manner as described above but running at a lower power factor on full load.

I do not confine myself to the form of leakage path shown at 9 in Fig. 2. I may arrange the slots as shown in Fig. 7, so that the mouths of the single-phase slots issue directly upon the air-gap, instead of upon the back of the three-phase slots, as in Fig. 1.

While I have shown my invention in its preferred forms, it is not so limited but is susceptible of various minor changes and modifications within the scope of the appended claims.

I claim as my invention:

1. The combination with a dynamo-electric machine provided with two armature windings, of means for supplying alternating current to one of said windings, means for deriving alternating current of different nature from the other of said windings, and means for neutralizing the magnetic reaction of said derived current upon said supplied current, said neutralizing means being energized in accordance with the supply current, whereby the effect thereof is substantially proportional to said supply current.

2. The combination with a dynamo-electric machine provided with a slotted armature core, of a winding disposed adjacent to the bottom of certain of the slots of said core member, an additional winding disposed adjacent to the tops of certain of the slots of said core member, a portion of said slots being common to both windings, means for producing a unidirectional exciting field in said dynamo-electric machine, movable with respect to said core member, means for supplying polyphase alternating currents to one of said windings, means for deriving single-phase alternating current from the other of said windings, and means for substantially neutralizing the magnetic reaction of said single-phase current upon said polyphase supply under all conditions of load.

3. The combination with a dynamo-electric machine provided with a slotted armature core, of a winding disposed adjacent to the bottom of certain of the slots of said core member, an additional winding disposed adjacent to the tops of certain of the slots of said core member, a portion of said slots being common to both windings, means for producing a unidirectional exciting field in said dynamo-electric machine, movable with respect to said core member, an auxiliary winding disposed in certain of said slots and having the planes of its turns substantially parallel to the slot depth, means for supplying polyphase alternating currents to one of said windings, means for deriving single-phase alternating currents from the other of said windings, and means for energizing said auxiliary winding substantially in proportion to the currents in said polyphase winding, the direction of the resultant auxiliary magnetomotive force being opposed to the leakage reaction, across the slots of said single-phase winding.

4. The combination with a dynamo-electric machine provided with a slotted armature core, of a winding disposed adjacent to the bottom of certain of slots of said core member, an additional winding disposed adjacent to the tops of certain of the slots of said core member, a portion of said slots being common to both windings, means for producing a unidirectional exciting field in said dynamo-electric machine, movable with respect to said core member, tooth members projecting inwardly from the walls of said slots between said two windings, an auxiliary winding having turns disposed around said tooth members, means for supplying polyphase alternating currents to said top winding, means for deriving single-phase alternating current from said bottom winding, and means for energizing said auxiliary winding substantially in proportion to the energization of said polyphase winding, the resultant auxiliary magnetomotive force being of such magnitude and direction as to substantially neutralize the reaction of said derived current upon said supply currents.

5. The combination with a dynamo-electric machine provided with a slotted armature core, of a winding disposed adjacent to the bottom of certain of the slots of said core member, an additional winding disposed adjacent to the tops of certain of the slots of said core member, a portion of said slots being common to both windings, means for producing a unidirectional exciting field in said dynamo-electric machine, movable with respect to said core member, tooth members projecting inwardly from the walls of said slots between said two windings, an auxiliary winding having turns disposed around said tooth members, means for supplying polyphase alternating currents to said top winding, means for deriving single-phase alternating current from said bottom winding, and means for connecting said auxiliary winding in series relation with said polyphase winding, the resultant auxiliary magnetomotive force being of such magnitude and direction as to substantially neutralize the reaction of said derived current upon said supply currents.

6. The combination with a dynamo-electric machine provided with a slotted armature core member, of a single-phase winding disposed adjacent to the bottom of certain of the slots of said core member, a main polyphase winding disposed adjacent the tops of certain of the slots of said core member, a portion of said slots being common to each winding, means for producing a unidirectional exciting field in said dynamo-electric machine movable with respect to said armature core member, an auxiliary polyphase winding mounted in a portion of the slots of said main polyphase winding and having the planes of its turns substantially parallel to the slot depth, means for supplying polyphase currents to said main polyphase winding, means for connecting the different phases of said auxiliary winding in series relation with the co-phasial portions of said main polyphase winding, and means for deriving single-phase current from said single-phase winding, the magnetomotive forces of said auxiliary winding being of such direction and magnitude as to substantially neutralize the reaction of said single-phase winding upon said polyphase winding.

7. The combination with a dynamo-electric machine provided with a slotted armature core member, of a single-phase winding disposed adjacent to the bottom of certain of the slots of said core member, a main polyphase winding disposed adjacent the tops of certain of the slots of said core member, a portion of said slots being common to each winding, means for producing a unidirectional magnetic field in said dynamo-electric machine movable with respect to said armature core member, a tooth member projecting from the sides of certain of the slots carrying said polyphase winding between said polyphase winding and said single-phase winding, an auxiliary polyphase winding disposed around said tooth members, means for connecting the different phases of said auxiliary winding in series relation with the co-phasial portion of said main polyphase winding, and means for deriving single-phase current from said single-phase winding, the magnetomotive forces of said auxiliary winding being of such direction and magnitude as to substantially neutralize the reaction of said single-phase winding upon said polyphase winding.

In testimony whereof, I have hereunto subscribed my name this 23rd day of November 1916.

MILES WALKER.

Witnesses:
 JAS. STEWART BROADFOOT,
 MARGARET S. MAYOH.